United States Patent [19]

Neuweiler et al.

[11] 4,183,473
[45] Jan. 15, 1980

[54] MECHANISM FOR COUPLING A DRIVE TO A SHAFT

[75] Inventors: Armin Neuweiler, Steckborn; Jakob Rickenbach, Kreuzlingen, both of Switzerland

[73] Assignee: Fritz Gegauf Aktiengesellschaft, Switzerland

[21] Appl. No.: 858,449

[22] Filed: Dec. 7, 1977

[30] Foreign Application Priority Data

Jan. 14, 1977 [CH] Switzerland .................. 446/77

[51] Int. Cl.² ...................... F16D 19/00; B65H 54/18
[52] U.S. Cl. ..................................... 242/20; 112/220; 112/279; 192/95
[58] Field of Search .............. 112/220, 279, 271; 242/20, 22; 192/95, 97, 109 K, 94

[56] References Cited

U.S. PATENT DOCUMENTS

| | | | |
|---|---|---|---|
| 2,858,785 | 11/1958 | Kuhar | 112/220 |
| 3,021,801 | 2/1962 | Johnson | 112/279 |
| 3,224,398 | 12/1965 | Greulich | 112/220 |
| 3,454,145 | 7/1969 | Gegauf | 192/95 X |
| 3,776,336 | 12/1973 | Fresard | 112/220 X |
| 3,869,030 | 3/1975 | Masari | 192/95 X |

*Primary Examiner*—H. Hampton Hunter
*Attorney, Agent, or Firm*—McGlew and Tuttle

[57] ABSTRACT

A mechanism for coupling and uncoupling a driven rotatable drive wheel from a rotatable shaft, particularly, the arm shaft of a sewing machine from its associated drive wheel in order to spool up the lower thread, comprises a rotatable shaft which has an annular collar portion which is frictionally engageable by a drive wheel which is freely rotatable on the shaft. The drive wheel is continuously driven from a drive, such as a belt, and it may be urged into engagement with the collar by means of a nut which is threaded onto the end of the shaft. The arrangement includes a stop disc which has a cam surface which is engageable with a stop defined on the nut end face in a recess thereof. The cam surface and the stop define a cam structure which permits rotation of the nut so as to permit frictional engagement of the drive wheel with the shaft collar for driving the shaft and the disengagement thereof by rotation of the nut in a reverse direction. The amount of movement permitted to the nut is such to permit easy engagement or disengagement of the drive shaft without moving the nut to such a degree that, for example, it may cause the drive wheel to disengage from the frictional drive with another rotatable mechanism, such as a spooling device.

6 Claims, 4 Drawing Figures and the hub of drive wheel 5 itself, are mounted on threaded extension 6.

MECHANISM FOR COUPLING A DRIVE TO A SHAFT

FIELD AND BACKGROUND OF THE INVENTION

This invention relates in general to couplings and, in particular, to a new and useful mechanism for coupling and uncoupling a drive wheel to and from a shaft, particularly, to and from the arm shaft of a sewing machine.

DESCRIPTION OF THE PRIOR ART

In household sewing machines, as well as in some industrial sewing machines, coupling mechanisms for uncoupling the sewing part from the drive to permit spooling of the lower thread, are quite usual. Such coupling mechanisms are preferably designed as frictional couplings, in which the hub of the drive wheel carried on the arm shaft of the sewing machine is pressed axially against a contact surface which is non-rotatably connected to the shaft by means of a coupling screw provided on the shaft end in order to provide the friction necessary to drive the sewing mechanism.

In the prior art, the pressure is transferred from the coupling screw to the hub of the drive wheel through a release disc which is provided between the drive wheel and the coupling screw and is non-rotatably connected to the arm shaft, and which carries one or more stop cams extending radially beyond the diameter of the shaft. A stop axially projecting from the coupling screw cooperates with one of these stop cams in order to limit the radial release path of the coupling screw and to keep the axial running clearance of the drive wheel within relatively narrow limits. Should the axial running clearance of the drive wheel be too large, with the coupling disengaged, a disagreeable running noise is produced and, in addition, the friction of the drive wheel of the spooling mechanism which is usually directly engaged with the drive wheel of the sewing machine is reduced.

To keep the radial release path of the coupling screw within reasonable limits, the release disc, which is non-rotatably connected to the arm shaft and provided with the stop cams, can be selectively brought into different assembly positions, with the radial position of the effective stop cam relative to the stop connected to the coupling screw depending on the chosen assembly position of the release disc. Such coupling mechanisms are shown and described, for example, in U.S. Pat. No. 2,858,785 and U.S. Pat. No. 3,454,145.

The prior art coupling mechanisms of this kind have the disadvantage that the most suitable assembly position of the release disc cannot be determined in advance. The release disc must first be mounted in a random position, and only after the assembly of the coupling mechanism is completed, can it be determined, depending on the random position of the stop connected to the coupling screw, whether the radial release path of the coupling screw falls within the limits necessary for a satisfactory function. If the release path is too large or too small, the coupling mechanism must be partly disassembled again to bring the release disc into another assembly position in which the radial position of the effective stop cam provides a more suitable release path for the coupling screw.

SUMMARY OF THE INVENTION

The present invention is directed to a coupling mechanism in which the disadvantages of the prior art coupling mechanisms are avoided. In the inventive coupling mechanism, the stop disc which is non-rotatably connected to the shaft is provided on the side which is remote from the sewing mechanism (or other operating mechanism) of the coupling screw and designed in a manner such that the radial release path of the coupling screw can be adjusted after the complete assembly of the coupling mechanism, without first having to determine experimentally the most suitable radial position of the effective stop cam.

Accordingly, it is an object of the invention to provide a drive mechanism for coupling and uncoupling a rotatable drive wheel which is usually continuously driven to and from a shaft and which includes a nut which is threaded on the shaft and which may be rotated to urge the drive wheel into frictional driving engagement with the shaft when rotation is in one direction and to disengage the shaft from the rotating drive wheel when it is moved in an opposite direction and which further includes means for permitting movement of the adjustment nut only to a predetermined arcuate rotational movement.

A further object of the invention is to provide a coupling mechanism which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
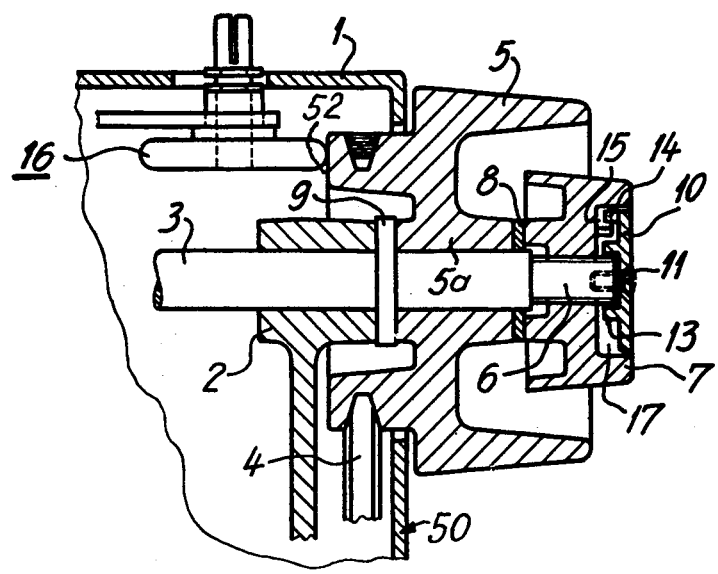
FIG. 1 is a partial sectional view of a coupling mechanism for a sewing machine drive constructed in accordance with the invention and taken on the line I—I of FIG. 3.
Figure 2:
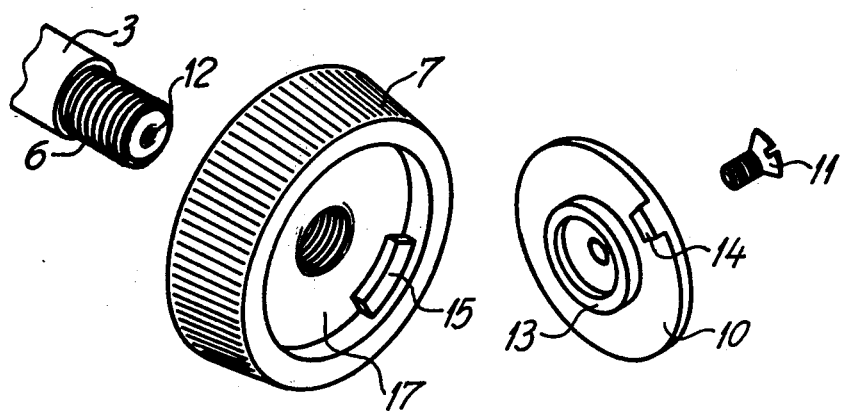
FIG. 2 is an exploded perspective view of the coupling mechanism shown in FIG. 1.
Figure 3:
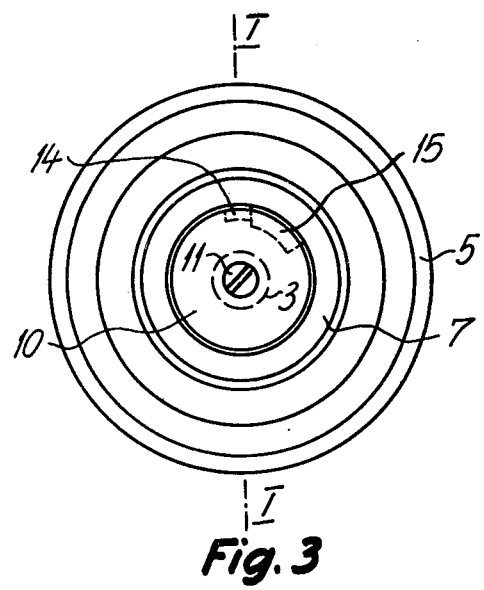
FIG. 3 is a front view of the coupling mechanism.
Figure 4:
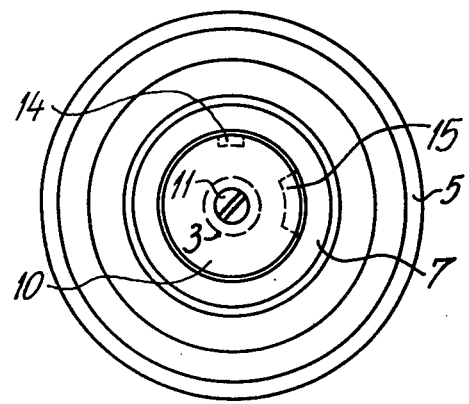
FIG. 4 is a view similar to FIG. 3 indicating an adjusted position in respect to the coupling mechanism.

Referring to the drawings in particular, the invention embodied therein, comprises a coupling mechanism for use on a sewing machine 50 which includes a rotatable arm shaft 3 which is selectively driven from a drive wheel 5.

A housing 1 of the sewing machine 50, shown in sectional view, accommodates a bearing 2 for an arm shaft 3. A drive wheel 5, such as a gear or pulley, which is driven off of a power source (not shown) through a drive means, such as a belt 4, is mounted on the arm shaft 3. The driven end of arm shaft 3 is provided with a threaded extension 6 on which a coupling nut 7 is screwed. A clamping washer 8, provided between drive wheel 5 and coupling nut 7, for transferring driving torque from the arm shaft 3 to the hub of drive wheel 5, is pressed against a collar 9 of arm shaft 3 by tightening coupling nut 7.

By means of a screw 11, preferably having a lefthand thread which is screwed into a taphole 12 of arm shaft 3, a stop disc 10 is non-rotatably secured to the front side of arm shaft 3. Stop disc 10 is provided with a centering extension or centering ring portion 13 which engages over the threaded extension 6 of arm shaft 3. Stop disc 10 carries a stop cam 14 which, in an assembled state of the coupling mechanism, projects into the path of motion of a stop 15 which is provided in a cylindrical recess 17 of coupling nut 7, and cooperates therewith, in order to limit the release path of coupling nut 7 while disengaging the coupling mechanism. An engageable and disengageable spooling device, generally designated 16, is frictionally drivably connected to an annular end surface 52 of drive wheel 5 in its engaged position for spooling up the lower thread. The drive wheel 5 has a hub portion 5a which is frictionally driven from the shaft 3 between collar 9 and clamp washer 8.

To assemble the coupling mechanism, first the drive wheel 5 and clamping washer 8 are engaged on arm shaft 3. Then coupling nut 7 is screwed on threaded extension 6 of arm shaft 3 and is tightened. The hub of drive wheel 5 is thereby pressed against collar 9 of arm shaft 3, which produces the necessary friction for driving the sewing mechanism. Upon tightening of coupling nut 7, stop 15 comes into a random position in a complete circular line having its center in the axis of arm shaft 3. Stop disc 10 is thereupon engaged on threaded extension 6 of arm shaft 3, where it is centered by means of centering extension 13, and brought into a radial position in which an angle corresponding to the desired release path is formed between stop 15 of coupling nut 7 and stop cam 14 of stop disc 10, the angle vertex being in the axis of arm shaft 3. As soon as the release path of coupling nut 7 is thus adjusted, stop disc 10 is non-rotatably connected to arm shaft 3 by tightening screw 11.

If it is now desired to disengage the sewing mechanism from the drive to spool up the lower thread, coupling nut 7 is turned counterclockwise in a well-known manner, until stop 15 of coupling nut 7 abuts against stop cam 14 of stop disc 10. There is then no longer frictional contact between the hub portion 5a of drive wheel 5 and collar 9 of arm shaft 3, but drive wheel 5 will still drive only the spooling device 16 which will remain in frictional engagement with the spooling device.

In accordance with the embodiment of coupling mechanism, described above, by turning stop disc 10 on threaded extension 6 of arm shaft 3, stop cam 14 of stop disc 10 can be brought continuously into any position on the complete circular line having its center in the axis of arm shaft 3, and fixed therein. It is also possible, of course, to design the end of threaded extension 6 of arm shaft 3, and stop disc 10 secured thereto, in a manner such that stop disc 10 with stop cam 14 can be selectively fixed in a plurality of predetermined assembly positions, and that the assembly position is selected in accordance with the most suitable release path of coupling nut 7.

While a specific embodiment of the invention has been shown and described in detail to illustrate the application of the principles of the invention, it will be understood that the invention may be embodied otherwise without departing from such principles.

What is claimed is:

1. A mechanism for coupling and uncoupling a drive wheel to and from a rotatable shaft, particularly to an arm shaft of a sewing machine, comprising a rotatable shaft having an annular collar portion, a drive wheel freely rotatable on said shaft and having a hub portion with one end frictionally engageable with said collar portion and having an opposite end, drive means connected to said drive wheel to rotate said drive wheel, said shaft having a threaded end extending beyond the end of said drive wheel, an adjustment nut threaded to said shaft and adapted to bear against the opposite end of said drive wheel to hold it in frictional engagement with said collar to rotate said shaft with said drive wheel, a stop disc secured to the threaded end of said shaft, and cam means defined between said adjustment nut and said stop disc limiting the rotational movement of said adjustment nut to a predetermined arc of movement, said adjustment nut being adjustable by threading on said shaft through the predetermined arc in one direction to engage said drive wheel with said collar to rotate said shaft and movable in an opposite direction to release said shaft from said drive wheel.

2. A mechanism, as claimed in claim 1, including a spooling device having a rotational frictional part mounted in engagement with an end of said drive wheel and being frictionally driven by said drive wheel, said rotational part being maintained in driving engagement with said drive wheel when said drive wheel is moved to a direction to release said shaft.

3. A mechanism, as claimed in claim 1, wherein said cam means comprising a stop on said adjustment nut and a cam on said stop disc, said stop being movable through a radial arc relative to said cam and being contactable with said cam to stop rotation of said nut in each rotational direction of movement thereof.

4. A mechanism, as claimed in claim 3, wherein said cam forms an integral part of the inner face of said stop disc, said nut having a recess of a size to receive said stop disc and having a stop defined in said recess engageable with said cam.

5. A mechanism, as claimed in claim 1, wherein said drive wheel has an outer end with a recess, said nut being disposed within the recess of said drive wheel and threaded on said threaded portion of said shaft, said nut having an outer face with a cylindrical recess therein, said stop disc being disposed in said recess, said cam means comprising an inward projection on said stop disc and a stop comprising a curved projection formed on the interior of the recess of said nut.

6. A mechanism for coupling and uncoupling a drive wheel to and from a rotatable shaft, particularly to an arm shaft of a sewing machine, comprising a rotatable shaft having an annular collar portion, a drive wheel freely rotatable on said shaft and having a hub portion with one end frictionally engageable with said collar portion and having an opposite end, drive means connected to said drive wheel to rotate said drive wheel, said shaft having a threaded end extending beyond the end of said drive wheel, an adjustment nut threaded to said shaft and adapted to bear against the opposite end of said drive wheel to hold it in frictional engagement with said collar to rotate said shaft with said drive wheel, a stop disc secured to the threaded end of said shaft, and cam means defined between said adjustment nut and said stop disc limiting the rotational movement of said adjustment nut to a predetermined arc of movement, said adjustment nut being adjustable by threading on said shaft through the predetermined arc in one direction to engage said drive wheel with said collar to rotate said shaft and movable in an opposite direction to release said shaft from said drive wheel, said cam means comprising a a stop on said adjustment nut and a cam on said stop disc, said stop being movable through a radial arc relative to said cam and being contactable with said cam to stop rotation of said nut in each rotational direction of movement thereof, said stop disc being removable from said shaft and being provided with one end face having a centering ring engageable over said shaft and a screw threaded through said stop disc and into said shaft to hold said stop disc onto said shaft in an adjusted position.

* * * * *